United States Patent Office 3,824,176
Patented July 16, 1974

3,824,176

MATRIX HOLDER

Patrick B. Crowe, Eden Prairie, Minn., assignor to Buckbee-Mears Company, St. Paul, Minn.

Filed Aug. 28, 1972, Ser. No. 284,333
Int. Cl. B01k *3/00*
U.S. Cl. 204—297 R 7 Claims

ABSTRACT OF THE DISCLOSURE

A hinged frame for holding a matrix base for electroforming in an electroplating bath, which frame includes suitable rubber gasket material to define and isolate the central area of the electroforming matrix for plating. The frame includes one or more spring loaded electrical connectors for conducting current to the edges of the electroforming matrix.

BACKGROUND OF THE INVENTION

The prior art recognizes numerous products which may be constructed through a process of electroforming wherein suitable resist patterns are formed on base plates which plates are then immersed in an electroplating bath so as to plate a particular pattern of metal which ultimately results in the desired product. By way of example, one such product comprises ultra-fine metal mesh having accurately aligned, microscopically small holes. Such mesh may be used for a number of different purposes including extremely fine sieves and filters. Since metal mesh of this nature is much too fine and delicate to be produced by conventional manufacturing methods, it is generally manufactured by means of an electroforming process. In the prior art, the first step involves photographically preparing a suitable mesh pattern on the surface of a metal base plate. This plate is generally referred to as a matrix. The mesh is formed by immersing the matrix in an electroplating bath while providing suitable cathode connections to the matrix so as to electrodeposit metal onto the areas of the matrix not covered with resist. When the metal is deposited to the required thickness, the electroformed mesh is stripped off so that the plate may be reused. The economics of the situation require that the expensive matrix plate be reused as often as possible. However, with the prior art process, this has been more easily said than done for numerous reasons. The matrix plate is provided with a photoresist pattern only in the central area. The edges must be left clear so that the matrix can be handled and so that suitable electrical connnections can be made thereto. To avoid electrodeposition on these non-patterned edges, the matrix plate must be suitably masked with masking tape. This tape must be removed and replaced between each individual electrodeposition step. Therefore, for each piece of fine mesh provided, a great deal of labor must be expended to strip and clean the matrix plate and apply a new coating of masking tape. This produces a large fixed cost just in the cost of tape consumed alone. In addition, a great deal of labor and time is required to prepare each plate for another electrodeposition cycle. Despite the use of the tape, some electrodeposition invariably takes place on various edges and corners and particularly on the electrical contacts themselves which must necessarily contact the plate at some location. This problem is compounded by the fact that to achieve an even electrodeposition requires several electrical connections about the perimeter of the plate in order to provide an even distribution of current flow.

Another problem arises in that masking tape, no matter how carefully applied, still does not provide as straight an edge as would be desired on the final product, often resulting in products which must be rejected. In some cases, the electrodeposition action begins under the edge of the tape providing an imperfect and irergular border on the final piece of mesh. All of the above problems are alleviated by the special matrix frame holder contemplated by the instant invention.

SUMMARY OF THE INVENTION

Briefly, my invention comprises a non-electrically conducting frame which completely encloses the edges of the matrix and the electrical contacts so that they never encounter the electroplating solution. Special gaskets in the frame isolate the central area of the matrix allowing the electroplating solution to operate only on that area which has been prepared with a photoresist pattern. The matrix is enclosed in the frame and the frame lowered into the electrolyte solution with the electrical contacts emerging from the frame at a location outside of the bath. After the required time, the matrix plate is removed from the electrodepositing bath, the frame is opened, and the metal mesh stripped off. Since the plate is completely protected by the frame, a simple washing and rinsing step is all that is necessary to prepare the matrix for another deposition cycle. It may therefore, be seen that it is an object of my invention to provide a much improved apparatus and process for producing electroformed products.

It is a further object of my invention to provide a frame designed to enclose and protect matrix bases for electroformed products so that only the desired portion of the metal base matrix is exposed to the electrodeposition bath. Further objects and advantages will become apparent upon consideration of the following description and drawings.

DESCRIPTION OF THE PREFERRED EMBODIMENT

Figure 1:
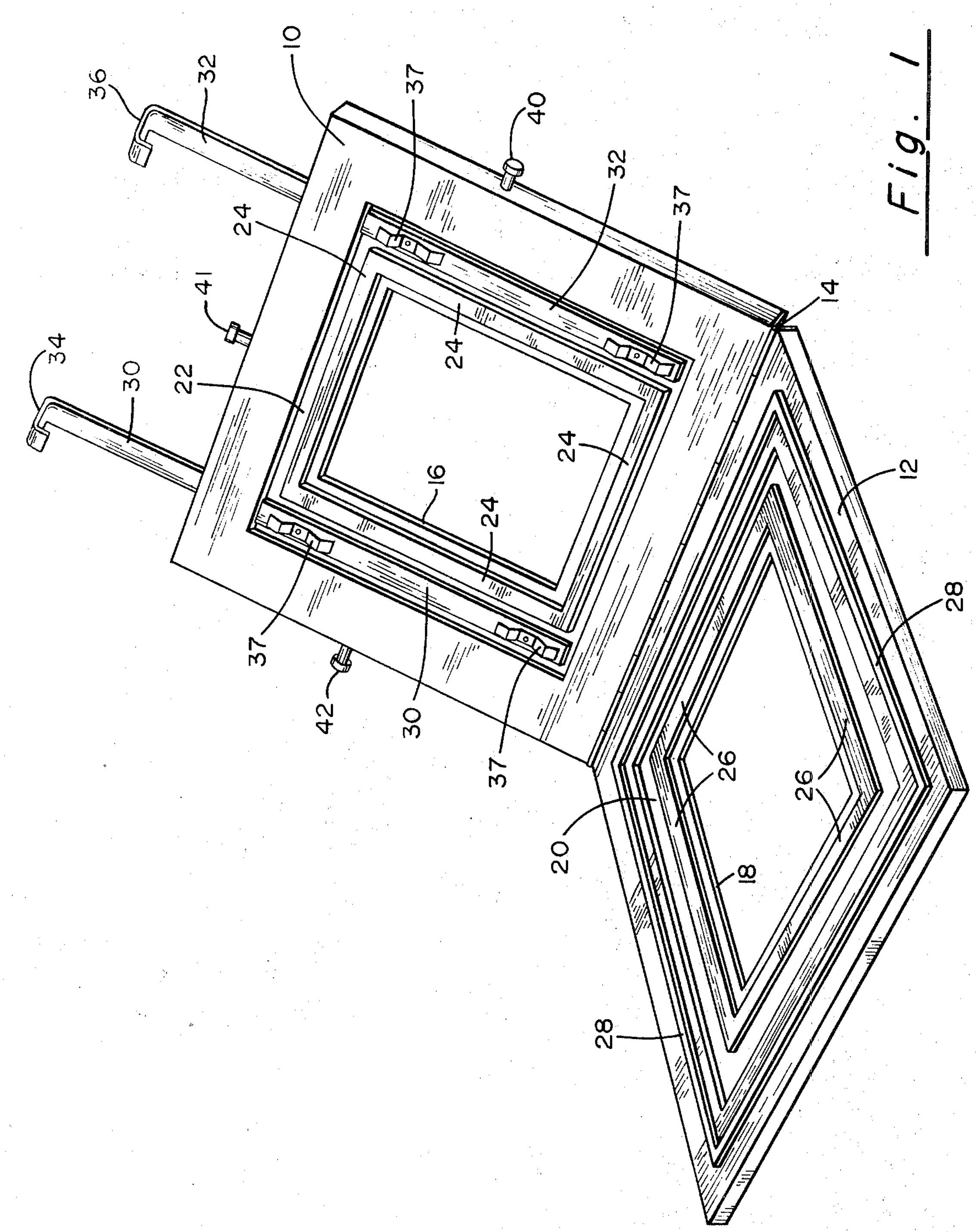
FIG. 1 is a perspective view of one preferred embodiment of the present invention utilizing a frame which permits exposure of two matrix plates simultaneously.

In FIG. 1, the matrix holding frame of the present invention is shown in an open position and in perspective. A pair of non-conducting frame members 10 and 12 are hinged together by means of a hinge 14. In the preferred embodiment, frame members 10 and 12 have been constructed from wood although other non-conducting materials would serve as well. Frames 10 and 12 are designed to hinge together into facing contact. Member 10 is provided with a generally rectangular indentation 22 which corresponds approximately to another indentation 20 in frame member 12. When the matrix is inserted into the frame, it fits roughly between the indentations 20 and 22. With the matrix plate positioned in indentations 20 and 22, it is completely sealed on one face by a rectangular gasket 24 mounted about the circumference of the indentation 22. The matrix plate is sealed on the opposite side by a generally rectangular gasket 26 which is mounted about the circumference of indentation 20. Plating solution reaches the matrix through the cutout 16 in frame member 10 and the cutout 18 in frame member 12. On the other side of the gaskets 24 and 26, yet still mounted within the indentation 22, are a pair of copper bars 30 and 32 which extend out through slots in frame member 10 as shown in FIG. 1. These copper bars are provided with a number of spring clips 37 on the face thereof which contact the four corners of the matrix plate so as to provide a means for distributing electricity through the matrix plate. It should be noted that the bars and spring clips are isolated by gaskets 24 and 26 and thus, not subject to the electrodepositing bath. Another gasket, generally rectangular in shape, is positioned in the surface of member 12 and identified as gasket 28 in FIG. 1. Gasket 28 bears against the face of frame member 10 and insures that no electrolyte can enter from the outside of the frame and reach the edges of the matrix plates, the copper spring contacts 37, or the conducting bars 30 and 32.

Conducting bars 30 and 32 are provided with hook portions 34 and 36 at their ends which facilitate hanging the closed frame containing the matrix on a cathode bar with which electricity is conducted into the device when it is suspended in an electrodeposition bath. Frames 10 and 12 are latched into place by means of latches which are not shown in FIG. 1. The latches are omitted in FIG. 1 for the sake of clarity, although the latching pins 40, 41 and 42 are shown.

Figure 2B:
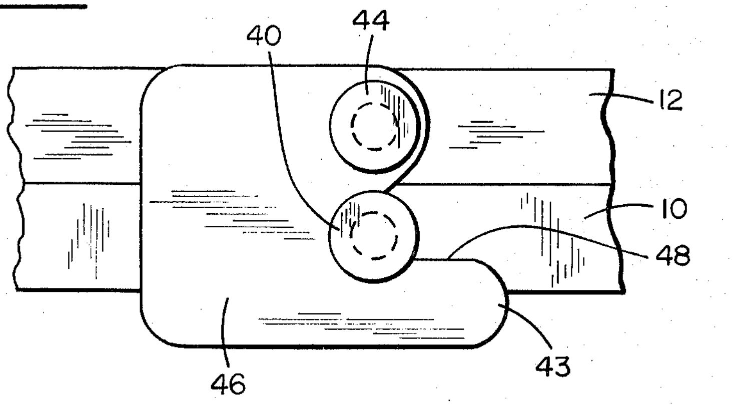
FIGS. 2*a* and 2*b* show one type of latching mechanism for holding the frame closed during the electrodeposition step.
Figure 2A:
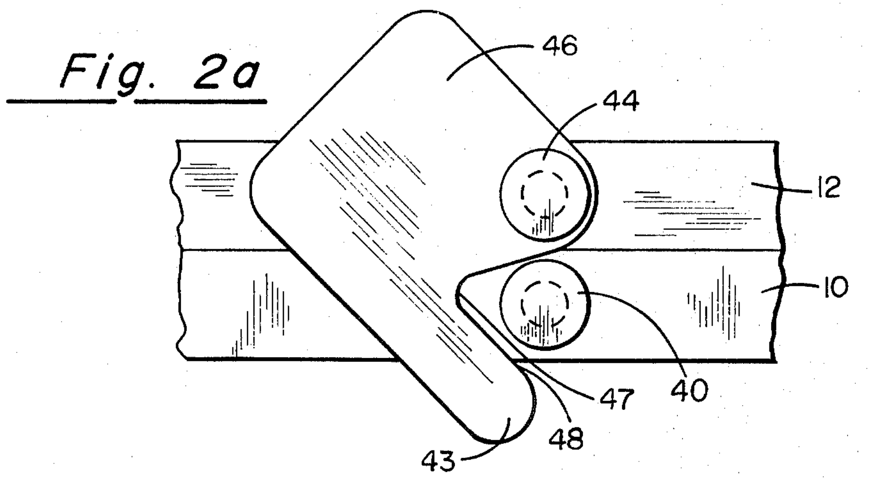

The latches are shown in detail in FIGS. 2*a* and 2*b*. In FIG. 2*a*, it may be seen that frame 10 is provided with a pin 40 as shown in FIG. 1. FIG. 2*a* also shows that frame 12 is provided with a second pin 44 upon which pivots a block 46 which has a hooked shape portion 43. Hooked shape portion 43 has a surface 47 which is slightly recessed with respect to a surface 48 so that as block 46 is rotated around pin 40 it assumes the position shown in FIG. 2*b*. In FIG. 2*b* it may be seen that pin 40 is locked into place resting in the indented surface 47, thus holding the frame tightly closed.

Figure 3:
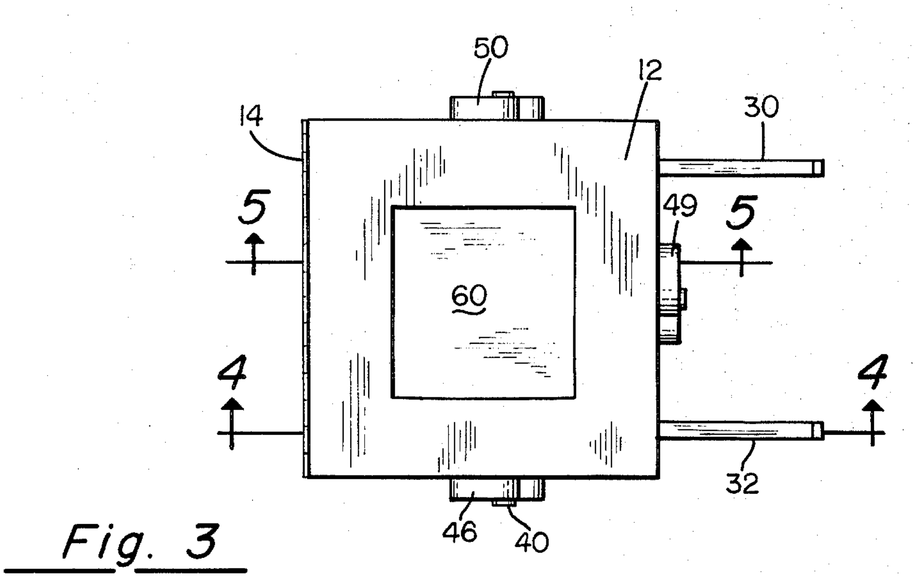
FIG. 3 shows a top view of the frame in a closed position showing in particular the location of the latches.

In FIG. 3, a top view of the closed matrix holder is shown. Here three locations are shown for the latches including the block 46 already described with respect to FIGS. 2*a* and 2*b* and also showing two more latches 49 and 50. The fourth side of the matrix holding frame is secured by hinge 14. In FIG. 3 two section lines are indicated and these sectional views are shown in FIG. 4 and FIG. 5.

Figure 4:
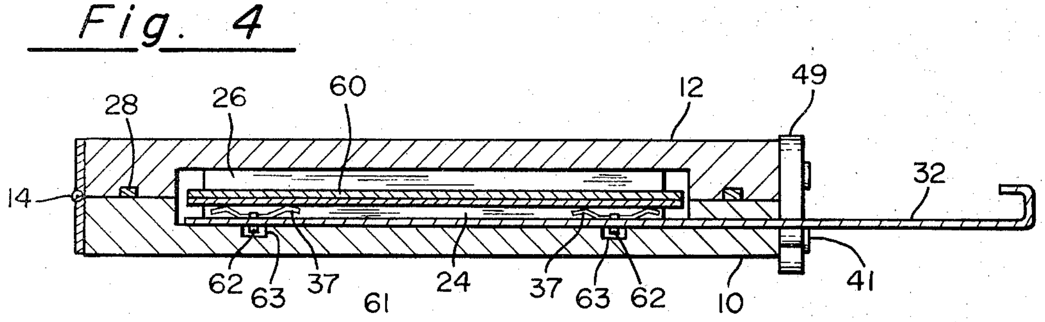
FIG. 4 is a sectional view of the closed frame taken alone line 4—4 in FIG. 3.
Figure 5:
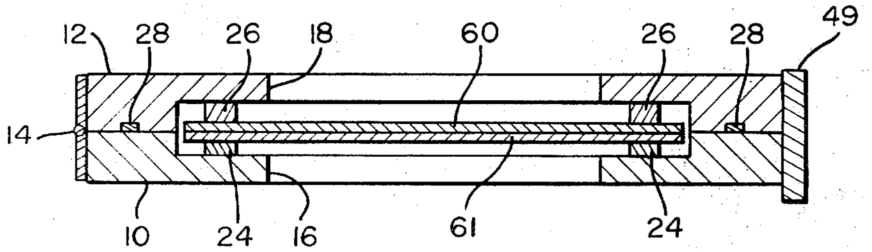
FIG. 5 is a sectional view of the closed frame taken along line 5—5 in FIG. 3.

In FIG. 4 and FIG. 5, it may be seen how the two matrix plates 60 and 61 may simultaneously be subjected to a bath by being placed back to back between the generally rectangular gaskets 24 and 26. Electrical contacts are made to the edge of matrix plate 60 and 61 by means of spring clips 37 bolted to a conducting bar 30 and 32. In the sectional drawing of FIG. 4 it may be seen that member 10 is provided with recesses 63 which accommodate a bolt 62 securing spring clips 37 to bar 32. A similar arrangement is used for the spring clips on bar 30. The circumferential sealing provided by gasket 28 is also more readily visible in FIG. 4 and FIG. 5.

Figure 6:
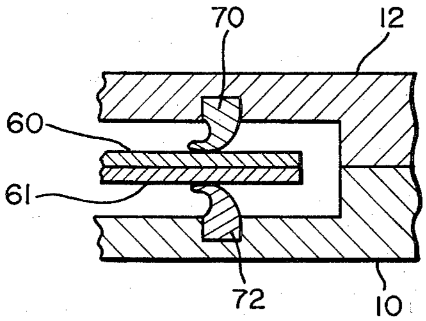
FIG. 6 is a sectional detail view showing a different type of sealing gasket which may be used with the present invention.

It will be noted in the drawings that gaskets 28 and 26 are shown to have roughly a rectangular cross section and to be mounted on frame members 10 and 12. This is not the only type of gasket that is suitable, however. Other embodiments have been successfully constructed with gaskets having a round cross section and also with gaskets having a specialized cross section such as those shown by gaskets 70 and 72 in FIG. 6. In FIG. 6, it may be seen that the gaskets are mounted in slots and provided with narrowed tips which are bent inward so as to provide especially good sealing against the back to back matrix plates 60 and 61.

Many modifications may be made to the apparatus shown without departing from the spirt and scope of the invention. Although all of the openings and gaskets are shown rectangular in the preferred embodiment, they may, of course, assume any shape necessary to handle the matrix plate upon which the desired product is being electroformed. Various shapes and styles of gaskets can be used as evidenced by FIG. 6. In one preferred embodiment of the invention, only one of the members 10 or 12 is provided with an opening to allow the electrodepositing bath solution to enter. With this embodiment, only a single matrix plate is subjected to the bath at any given time. By reference to the drawings, and particularly FIGS. 4 and 5, it will be seen that gaskets 24 and 26 provide a well defined clean edge along the plates beyond which electrodepositing cannot take place. It can be seen in the drawings that the edges of the plate are left completely isolated from the electrodeposition bath and therefore emerge from the process clean and ready for reuse. Since no corrosion ever takes place in the area outside of the gaskets 24 and 26, the spring clips 37 do not become corroded nor do the bars 30 and 32. The latches 46, 49 and 50 have been found to be very convenient for a quick opening and closing of the frame assembly. However, other types of latching mechanisms have been used as well including simple hooks and grooved blocks which fit over the outside of both frames 10 and 12. Considering all of the possible detail variations, the following claims are presented to cover only those novel aspects of the invention without being limited to the specific constructional features shown.

I claim:

1. An assembly for holding a flat metal base plate upon which an electroformed product is deposited while the base plate is immersed in an electrodeposition bath, said assembly comprising, in combination:

a pair of rigid, nonconducting frame members in back-to-back relationship, the back side of at least one of said frame members being indented to accommodate a flat metal base plate and at least one of said frame members having an opening through it for exposing a surface of a base plate to an electrodeposition bath;

first gasket means surrounding the frame opening for making pressure contact with the base plate to seal off part of the base plate from the electrodeposition bath entering through said opening;

said gasket means surrounding the outer edges of the base plate for sealing off the base plate from the electrodeposition bath entering from the outer edges of the frame members; and electrical conducting means in at least one of said frame members for making electrical contact with a base plate held between said frame members.

2. The apparatus of claim 1 including releasable latching means for holding said pair of frame members tightly closed together in back-to-back relationship with a base plate between them.

3. The apparatus of claim 2 in which said latching means includes hinge means between contiguous edges of said frame members.

4. The apparatus of claim 1 in which both frame members have openings and gasket means surrounding said openings for simultaneously exposing two separate base plates positioned back to back between them to an electrodeposition bath.

5. The apparatus of claim 1 in which both frame members have openings and gasket means surrounding said openings for simultaneously exposing two separate base plates positioned back to back between them to an electrodeposition bath.

5. The apparatus of claim 1 in which said conducting means comprising a pair of electrical conducting bars extending into the frame member and including spring contacts on said bars for making pressure contact against the base member in the area between said first and second gasket means.

6. The apparatus of claim 4 including releasable latching means for holding said pair of frame members tightly closed together in back-to-back relationship with two base plates between them.

7. The apparatus of claim 6 in which said latching means includes hinge means between contiguous edges of said frame members.

References Cited

UNITED STATES PATENTS

| | | | |
|---|---|---|---|
| 496,597 | 5/1893 | Catlin | 204—297 W |
| 2,197,632 | 4/1940 | Dowling et al. | 204—297 W X |
| 2,475,434 | 7/1949 | Moss | 204—297 W |
| 3,314,869 | 4/1967 | Dobbin et al. | 204—15 X |
| 3,317,410 | 5/1967 | Croll et al. | 204—23 |

FOREIGN PATENTS

| | | | |
|---|---|---|---|
| 1,590,570 | 5/1970 | France | 204—297 W |
| 658,485 | 10/1951 | Great Britain | 204—297 W |

FREDERICK C. EDMUNDSON, Primary Examiner